United States Patent
Huang

(10) Patent No.: US 9,196,014 B2
(45) Date of Patent: Nov. 24, 2015

(54) BUFFER CLEARING APPARATUS AND METHOD FOR COMPUTER GRAPHICS

(71) Applicant: INDUSTRIAL TECHNOLOGY RESEARCH INSTITUTE, Hsinchu (TW)

(72) Inventor: Ing-Jer Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 561 days.

(21) Appl. No.: 13/657,815

(22) Filed: Oct. 22, 2012

(65) Prior Publication Data

US 2014/0111512 A1    Apr. 24, 2014

(51) Int. Cl.
  G09G 5/393  (2006.01)
  G09G 5/39   (2006.01)
  G09G 5/36   (2006.01)
  G06T 1/60   (2006.01)

(52) U.S. Cl.
  CPC .. *G06T 1/60* (2013.01); *G09G 5/36* (2013.01); *G09G 5/363* (2013.01); *G09G 5/39* (2013.01); *G09G 5/393* (2013.01); *G09G 2360/12* (2013.01); *G09G 2360/18* (2013.01)

(58) Field of Classification Search
  None
  See application file for complete search history.

(56) References Cited

U.S. PATENT DOCUMENTS

| | | | |
|---|---|---|---|
| 4,587,629 A | | 5/1986 | Dill et al. |
| 5,426,445 A | * | 6/1995 | Prouty et al. ............... 345/28 |
| 5,841,447 A | | 11/1998 | Drews |
| 6,337,690 B1 | | 1/2002 | Ashburn et al. |
| 6,373,493 B1 | * | 4/2002 | Rickard et al. ............... 345/542 |
| 6,421,764 B2 | | 7/2002 | Morein |
| 6,911,990 B2 | | 6/2005 | Selig et al. |
| 6,982,713 B2 | | 1/2006 | Shao et al. |
| 7,075,545 B2 | | 7/2006 | Van Hook et al. |
| 2001/0028354 A1 | | 10/2001 | Cheng et al. |
| 2008/0036763 A1 | * | 2/2008 | Chen et al. ............... 345/422 |

(Continued)

FOREIGN PATENT DOCUMENTS

| | | |
|---|---|---|
| TW | 459203 | 10/2001 |
| TW | 200619934 | 6/2006 |

(Continued)

OTHER PUBLICATIONS

Patel et al., "Frame Buffer Energy Optimization by Pixel Prediction", Proceedings of the 2005 IEEE International Conference on Computer Design (ICCD' 05), pp. 98-pp. 101, Oct. 2005.
IBM, "Understanding VRAM and SGRAM Operation", IBM Applications Note, pp. 1-pp. 6, Dec. 1996.
Zhao et al., "A fast low power embedded cache memory design", 2001 Proceedings. 4th International Conference on ASIC, pp. 566-pp. 569, Oct. 2001.

(Continued)

*Primary Examiner* — Joni Richer
(74) *Attorney, Agent, or Firm* — Rabin & Berdo, P.C.

(57) ABSTRACT

According to one exemplary embodiment of a buffer clearing apparatus for computer graphics, a buffer clearing (BC) hardware agent is configured to interface between one or more system buses and a memory controller, to execute one or more frame buffer clearing operations while performing memory access or power of buffer-related operations at the same time. The BC hardware agent keeps track of a plurality of status to read from and/or write to a frame buffer. When the frame buffer is to be cleared, the BC hardware agent clears a clear tag table. When a background pixel of the frame buffer is to be read, the BC hardware agent returns a background value stored in itself.

21 Claims, 11 Drawing Sheets

(56) References Cited

U.S. PATENT DOCUMENTS

2008/0074434 A1* 3/2008 Wakayama .................. 345/530
2011/0119466 A1 5/2011 Slegel et al.

FOREIGN PATENT DOCUMENTS

| TW | I297469 | 6/2008 |
| TW | 200926051 | 6/2009 |

OTHER PUBLICATIONS

Persson, "Depth In-depth", ATI Technical report, pp. 1-pp. 10, 2007.
EtronTech, "EM636327 512K × 32 High Speed Synchronous Graphics DRAM(SGRAM)", EtronTech datasheet, pp. 1- pp. 78, Dec. 1998.
Deering et al., "FBRAM: a new form of memory optimized for 3D graphics", Proceedings of the 21st annual conference on Computer graphics and interactive techniques, pp. 167-pp. 174, Jul. 1994.

* cited by examiner

BUFFER CLEARING APPARATUS AND
METHOD FOR COMPUTER GRAPHICS

TECHNICAL FIELD

The present disclosure relates generally to a buffer clearing apparatus and method for computer graphics.

BACKGROUND

Frame buffer clearing is a frequently used and memory intensive operation in 3D graphics (3DG) applications. As the system on chip (SoC) technology and silicon process advance, 3DG related applications such as games, car navigation, user interface browsing, etc., are becoming popular on portable consumer electronics devices. FIG. 1 shows a typical 3DG SoC, which may include a central processing unit (CPU) 102, a 3DG accelerator 104 or a graphics processing unit (GPU) (not shown), a memory controller 106, an external memory 108 such as static random access memory (SRAM) or dynamic random access memory (DRAM), and a display unit 110. A 3DG application running on the CPU 102 controls the 3DG accelerator 104 to perform such as geometry transformation, lighting operations, texturing and primitive rendering. The rendered result is stored in a frame buffer (FB) 112 resided in the external memory 108, and is passed to the display unit 110. To produce a 3DG scene, a typical 3DG application may go through steps illustrated as follows. The CPU 102 puts 3D object data to the external memory 108. The 3DG accelerator 104 reads object data and processes 3D computations. The 3DG accelerator 104 draws the 3D scene to the frame buffer 112. The display unit 110 reads frame buffer 112 and displays to such as a monitor 114.

FIG. 2 shows a typical OpenGL ES, a popular 3DG application library for embedded systems, commands sequence for 3DG animation. A frame buffer (FB) may consist of a color buffer and a depth (Z) buffer. The rendering of a new frame starts with a buffer clearing operation to reset the storage cells of the color buffer to a background color and the storage cells of the depth buffer to an initial value, as indicated by a glClear command in FIG. 2. The 3D elements are then transformed and drawn on the buffers iteratively, as shown by the inner loop in FIG. 2. After all 3D elements of the current frame have been processed, the frame pointer is mapped to an alternative frame location to start the rendering of the next frame as shown by a glSwapbuffers command and the outer loop in FIG. 2, and a display unit 210 begins to fetch the frame data from the current frame buffer while the next frame is being rendered.

References such as patent documents or literatures disclose technologies for implementations of buffer clearing in such as 3DG applications. For example, an exemplary technology for clearing depth (Z) and color buffers in a real-time graphics rendering system may assign frame flags to pixels, and determine a Z value is valid or not. Instead of filling entire depth and color buffers, the technology only fills the hoes that were not drawn in the previous frame. Another exemplary technology for buffer clearing in 3DG applications may use coordinate values to obtain index values, and gets the content values of corresponding buffer blocks.

Yet another exemplary technology may use mechanisms such as Z compression, fast Z clearing, and hierarchical Z-buffer, for buffer clearing in 3DG applications. For the Z compression mechanism, the Z-buffer is stored in a lossless compressed format to minimize the Z-buffer bandwidth as Z read or write are taking place. For the fast Z clearing mechanism, the bandwidth of another Z-buffer write is used, instead of writing zeros throughout the entire Z-buffer. A fast Z clearing technique is used that may tag entire blocks of the Z-buffer as cleared, such that only each of those blocks need be tagged as cleared. For the hierarchical Z-buffer mechanism, it allows for the pixels being rendered to be checked against the Z-buffer before the pixel actually arrives in the rendering pipelines.

FIG. 3 shows an exemplary method of frame buffer clearing for a graphic rendering system. The method performs a frame dividing step to divide a frame into blocks with each block corresponding to an address of a system memory, and a flag bit (X, Y) is used to record a processing status of each block, as shown in step 310. According to a system reset command, the method changes each flag bit of each block as (X1, Y1) that indicates the block to be changed without performing a clear action, as shown in step 320. According to a system clear command, the method changes each flag bit (X1, Y1) into (X2, Y2) that indicates a clear action must be performed for the blocks, as shown in step 330. The method performs drawing (step 340) after the step 330. Before showing the output after finishing the drawing, the method clears the system memory, which includes performing a clear action for the system memory's addresses corresponding to the blocks with flag bit (X2,Y2), and changing the flag bit (X2, Y2) into (X3, Y3) for the blocks to indicate the blocks have been cleared, as shown in step 350.

Many solutions for buffer clearing in 3DG applications have been suggested. In general, the architectural mechanisms for the solutions may use such as counters, flags, cache, delay and distribution, and so on. Some special memories such as synchronous graphics random access memory (SGRAM), video RAM, etc., are designed for the solutions. These existing techniques still remain issues such as SoC retarget ability because most techniques are dedicated to few or only one device or SoC system. In addition, the issue for performance and power consumption of buffer clearing operations still exist in computer graphic systems.

SUMMARY

The exemplary embodiments of the disclosure may provide a buffer clearing apparatus and method for computer graphics.

One exemplary embodiment relates to a buffer clearing apparatus for computer graphics. The buffer clearing apparatus may comprise: a buffer clearing (BC) hardware agent configured to interface between one or more system buses and a memory controller, to execute one or more frame buffer clearing operations while performing a plurality of memory access or power of buffer-related operations at the same time; wherein the BC hardware agent keeps track of a plurality of status to read from and/or write to a frame buffer, and when the frame buffer is to be cleared, the BC hardware agent clears a clear tag table, when a background pixel of the frame buffer is to be read, the BC hardware agent returns a background value stored in itself.

Another exemplary embodiment relates to a buffer clearing method for computer graphics. The buffer clearing method may comprise: configuring a buffer clearing (BC) hardware agent to interface between one or more system buses and a memory controller; performing a buffer and tag clearing process by using the BC hardware agent to execute one or more frame buffer clearing operations while performing a plurality of memory access or power of buffer-related operations at the same time; wherein during the buffer and tag clearing process, the BC hardware agent keeps track of a plurality of status to read from and/or write to a frame buffer, and when the frame buffer is to be cleared, the BC hardware agent clears a clear tag table, when a background pixel of the frame buffer is to be read, the BC hardware agent returns a background value stored in itself.

DETAILED DESCRIPTION OF DISCLOSED EMBODIMENTS

Figure 1:
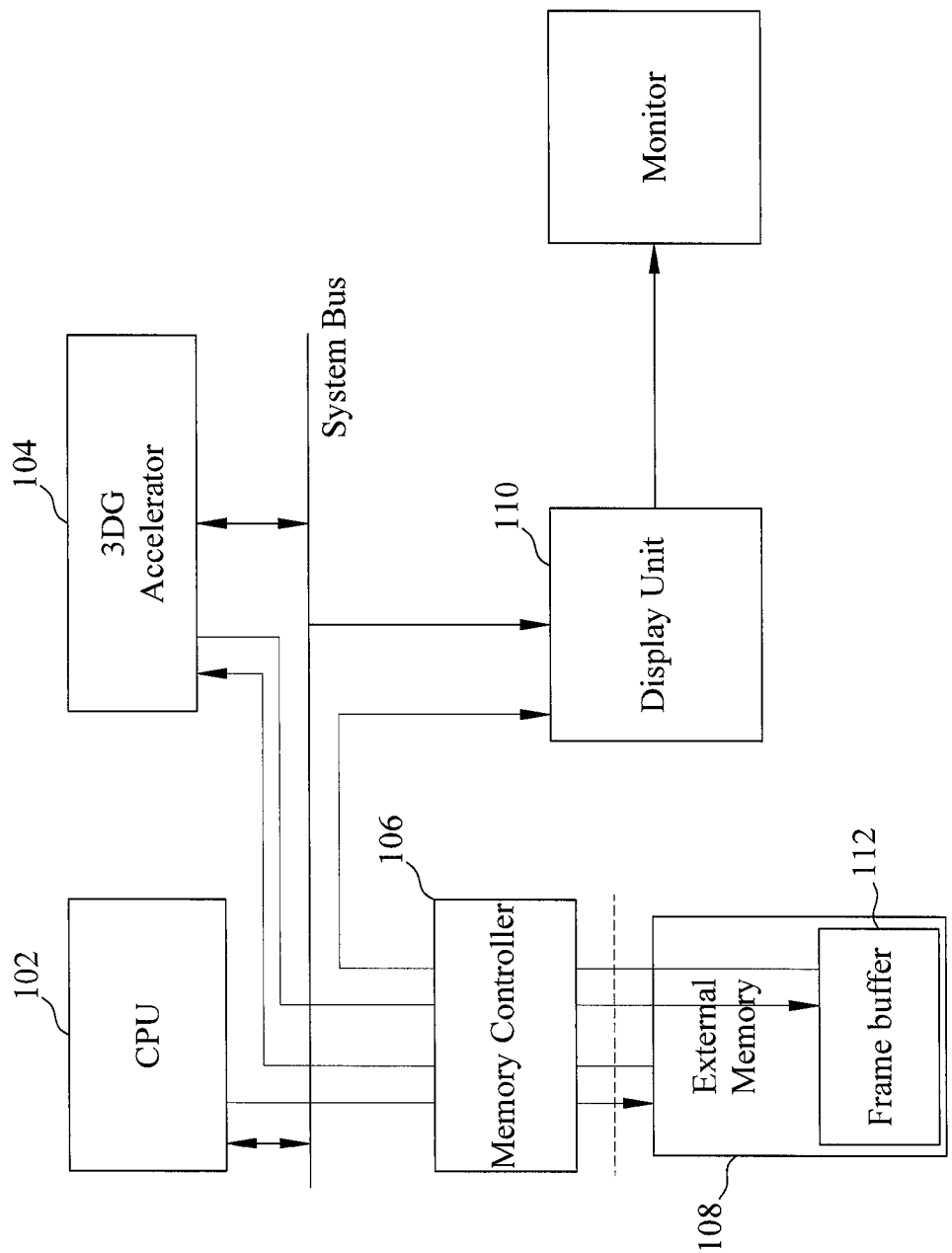
FIG. 1 shows a schematic view of a typical 3DG SoC.
Figure 2:
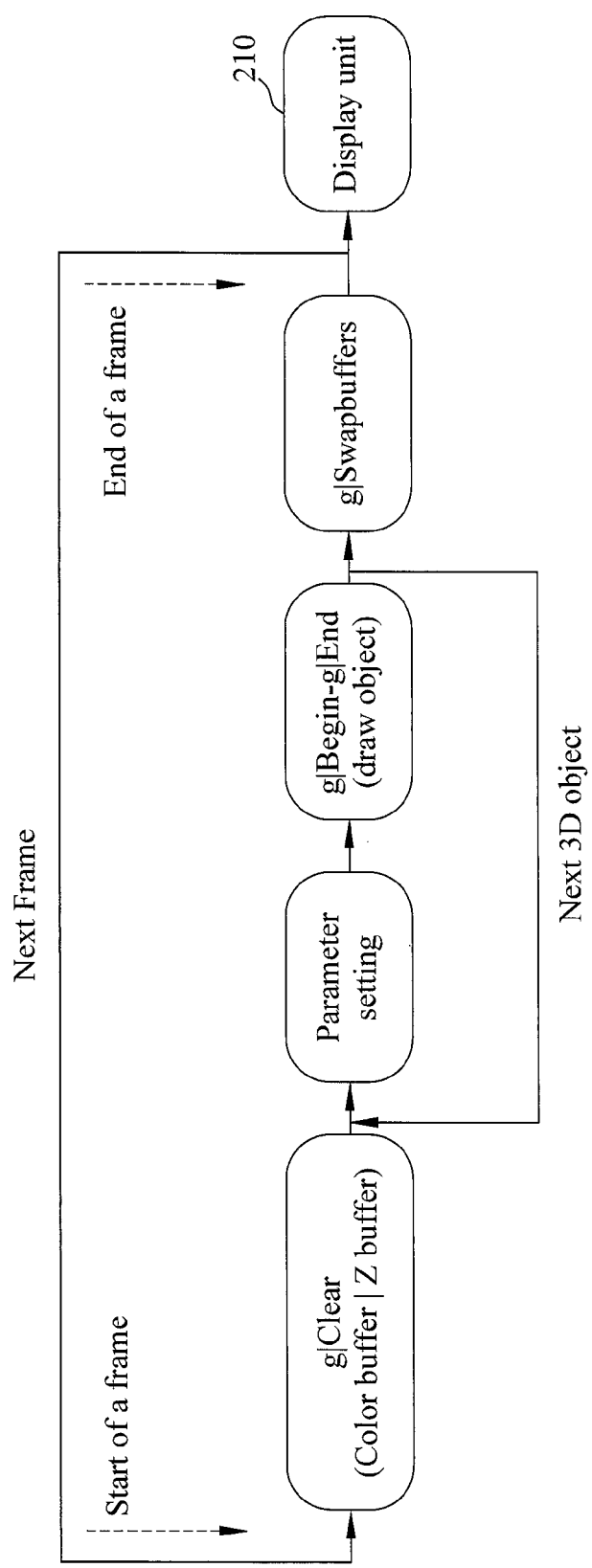
FIG. 2 shows a schematic view of a typical OpenGL ES, a popular 3DG application library for embedded systems.
Figure 3:
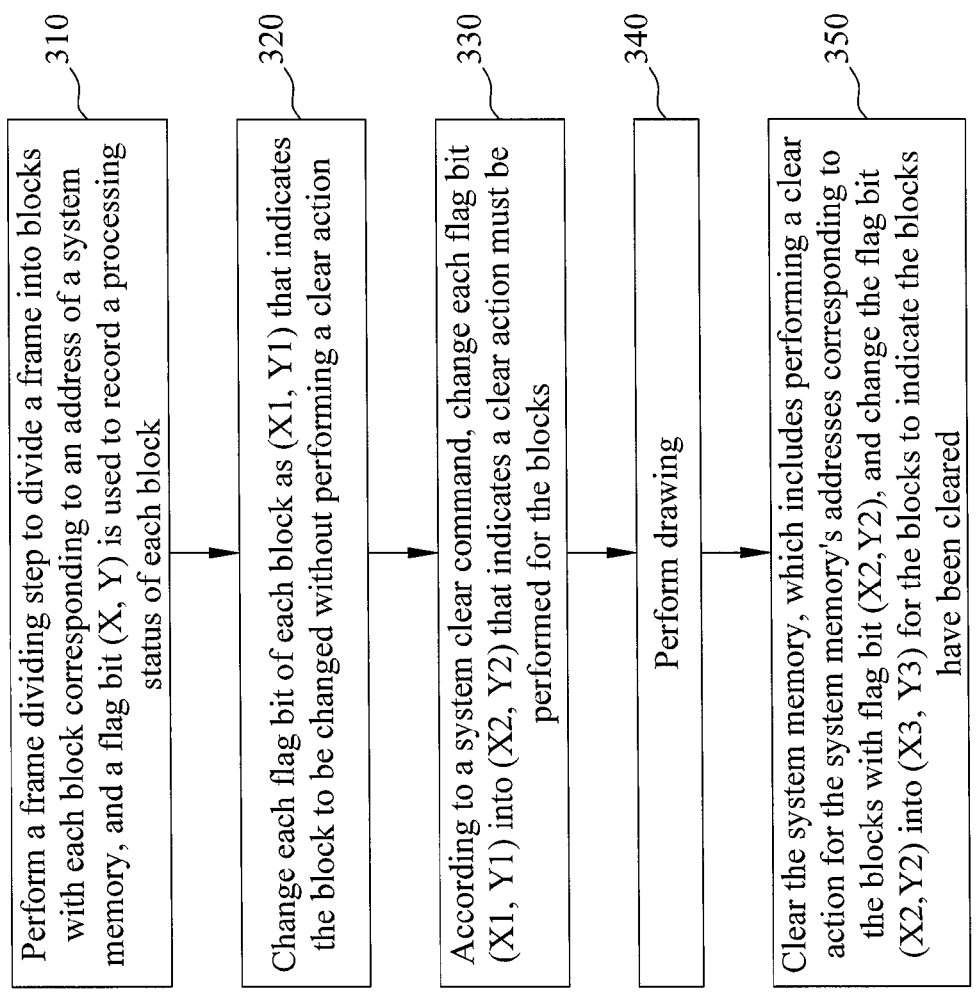
FIG. 3 shows an exemplary method of frame buffer clearing for a graphic rendering system.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments provide a buffer clearing technique for computer graphics that uses a buffer clearing (BC) hardware agent to execute the frame buffer clearing operations while performing the memory access or power of buffer related operations at the same time. The BC hardware agent is configured to interface between the system bus and the memory controller. This agent keeps track of the buffer clearing, drawing, and read status to read from and/or write to a frame buffer contained in an external memory. When the frame buffer is to be cleared, the agent clears a clear tag table, instead of the actual frame buffer in an external memory. When a background pixel of the frame buffer is to be read, the agent returns the background value stored in itself, instead of reading the data from the external memory. Thus the buffer clearing technique may improve memory efficiency. In addition, this agent is developed with retargetability in mind so that it may be easily integrated into most SoC platforms used in consumer electronics.

Figure 4:
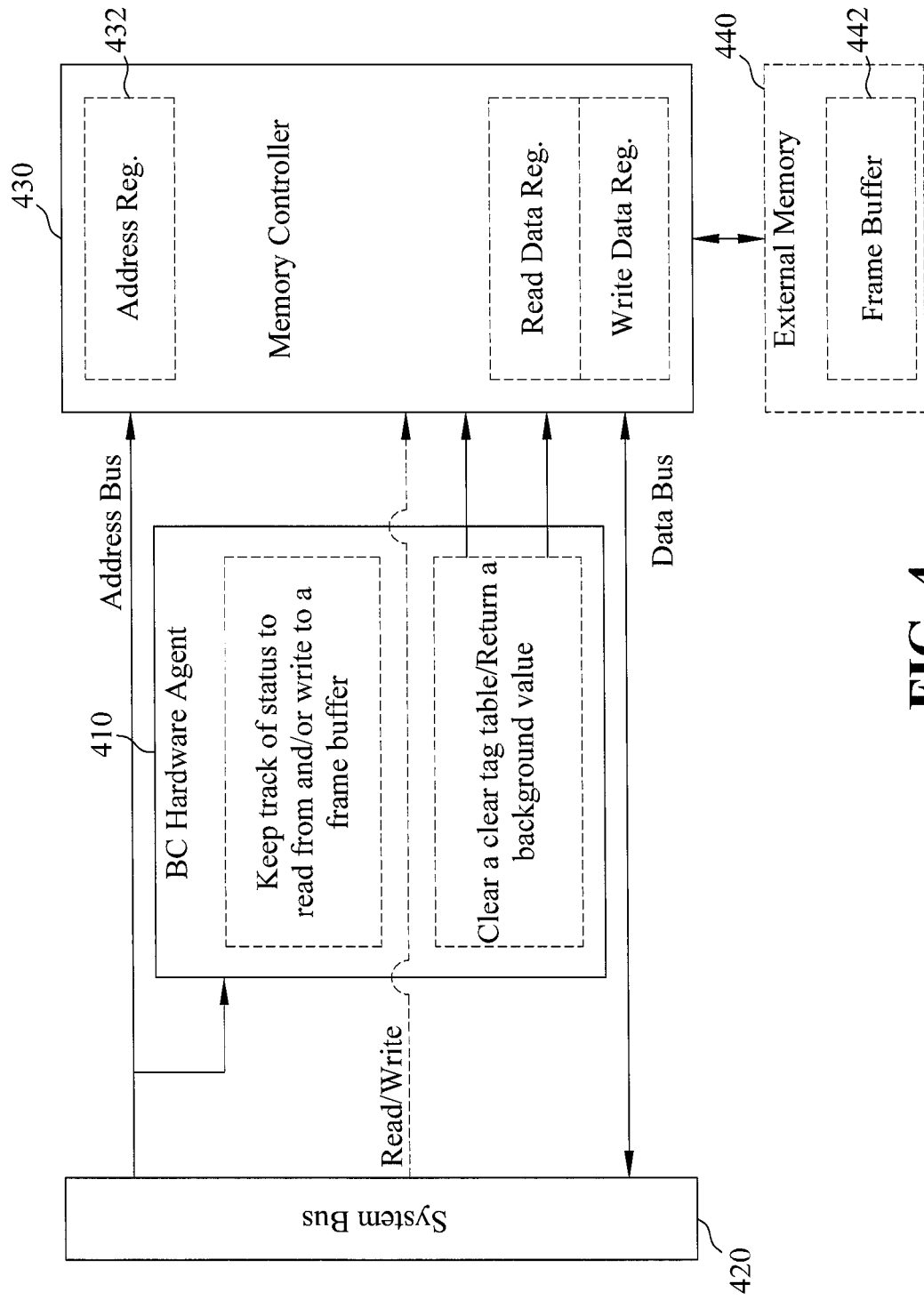
FIG. 4 shows schematic architecture of a buffer clearing apparatus for computer graphics, according to an exemplary embodiment.

FIG. 4 shows an organization of a buffer clearing apparatus for computer graphics, according to an exemplary embodiment. In FIG. 4, the buffer clearing apparatus 400 may configure a buffer clearing (BC) hardware agent 410 to interface between one or more system buses 420 and a memory controller 430. The BC hardware agent 410 monitors the activities on the system bus 420 to modify the behaviors of the memory controller 430, and keeps track of a plurality of status such as the buffer clearing, drawing, and read status to read from and/or write to a frame buffer 442. The frame buffer 442 may be, but not limited to, contained in an external memory 440 connected to the memory controller 430. When the frame buffer 442 is to be cleared, the BC hardware agent 410 clears a clear tag table, instead of the actual frame buffer in an external memory. When a background pixel of the frame buffer 442 is to be read, the agent returns the background value stored in itself. The memory controller 430 may include a set of registers such as address register(s) 432, read register(s) 434, and write register(s) 436. The external memory 440 may be such as SRAM, DRAM, synchronized RAM, and so on.

Figure 5:
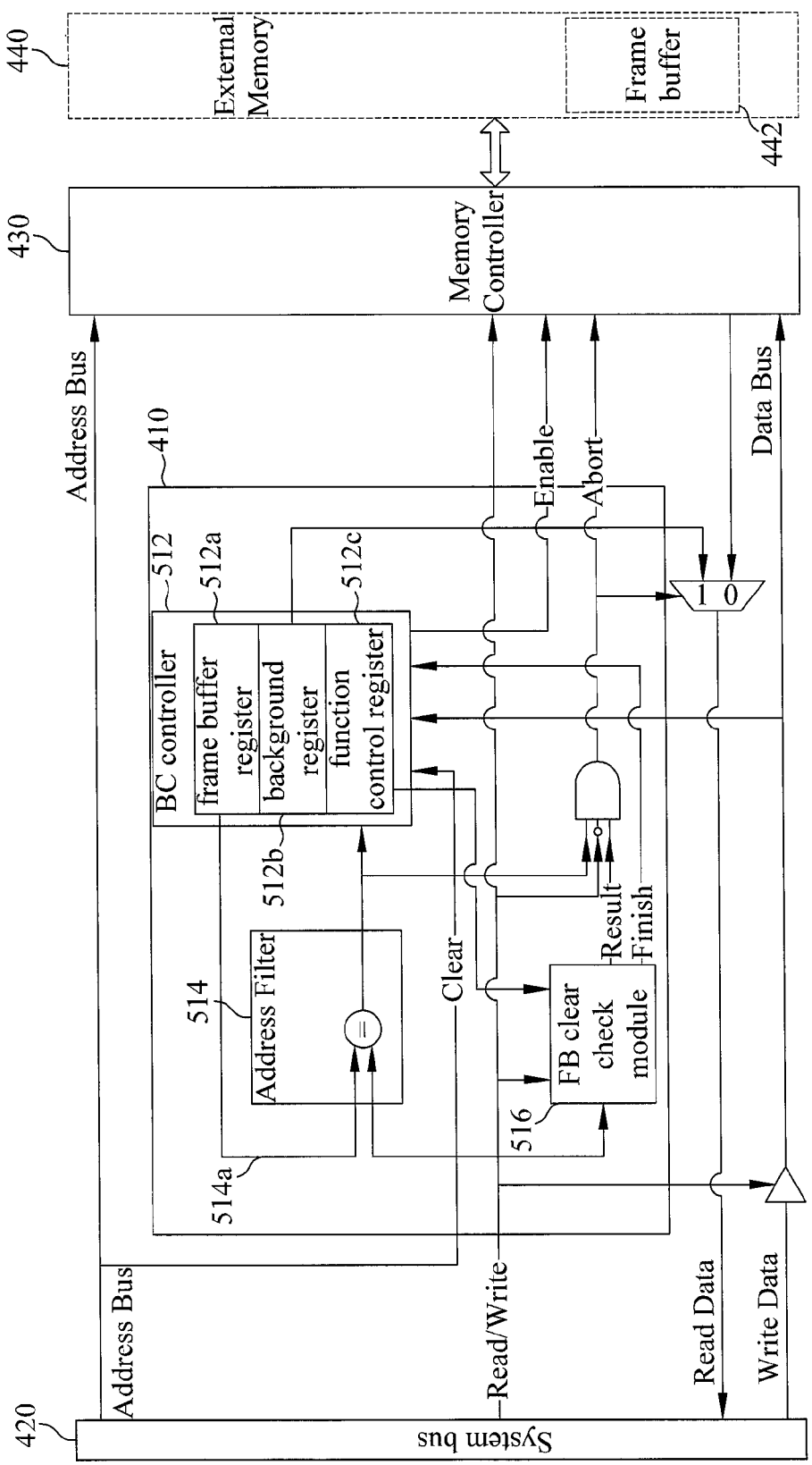
FIG. 5 shows an organization of the BC hardware agent shown in FIG. 4, according to an exemplary embodiment.

FIG. 5 shows an organization of the BC hardware agent 410, according to an exemplary embodiment. As seen in FIG. 5, the BC hardware agent 410 may configure a BC controller 512 to allocate the memory location for the frame buffer 442, and disable the BC hardware agent 410 and reset a clear tag table 502 via setting up such as a function control register. For example, the BC controller 512 may contain a set of registers which are configured through the system bus 420. A first register may be a frame buffer register 512a which stores the base address information and the size information of the frame buffer 442. A second register may be a background register 512b which may store background information such as the red, green, blue, and alpha values of the background color information, or depth information for the frame buffer 442. The background information is not limited to information of background color or background depth, which is exemplar only in the disclosure. The third register may be a function control register 512c which has several fields for the control of enable, reset, block size, clear and completion operations. The BC hardware agent 410 may be disabled to save power if the system using the buffer clearing apparatus 400 is not running 3DG applications. When the BC hardware agent 410 is disabled, it bypasses all memory accesses to the external memory 440. The first register also provides the flexibility to allow remapping the frame buffer 442. The frame buffer register, background register and function control register may be reconfigured to handle other types of pixel information in the frame buffer, such as depth, etc. In addition, multiple copies of these registers may be allocated in the BC hardware such that multiple types of pixel information may be handled without reconfiguring these registers.

The BC hardware agent 410 may configure an address filter 514 to determine if an incoming memory address 514a relates to a frame buffer access. The address filter 514 may determines if the incoming memory access is for the frame buffer by comparing the address 514a with the content in the frame buffer register 512a. After the comparison, the address filter 514 generates standby information. The BC hardware agent 410 may configure a FB (frame buffer) clear check module 516 to check if a block of pixels in the frame buffer have been cleared with the background register, wherein the block of pixels is pointed by the incoming memory address 514a. The read/write signal from system bus 420, the output from address filter 514, and the output from the FB (frame buffer) clear check module 516 may further pass through an AND gate to indicate if a memory read operation has been issued.

The value returned from the memory controller is dropped by a multiplexor along the data read path. The details will be described on the integration of the BC hardware agent 410 in a SoC.

Figure 6:
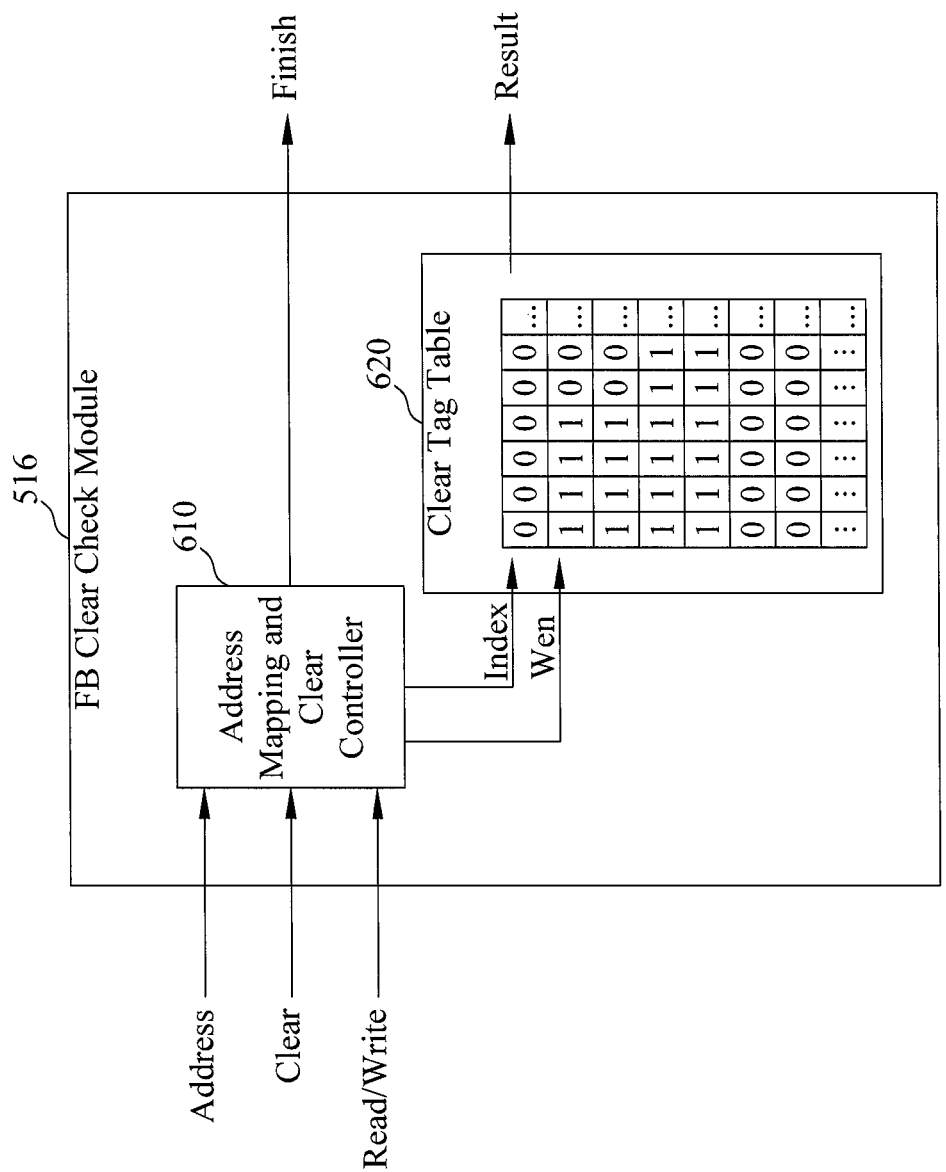
FIG. 6 shows an organization of the frame buffer clear check module shown in FIG. 5, according to an exemplary embodiment.

FIG. 6 shows an organization of the FB (frame buffer) clear check module 516, according to an exemplary embodiment. As shown in FIG. 6, the FB clear check module 516 may comprise a clear tag table 610 and an address mapping and clear (AMC) controller 620. The clear tag table 610 may have a plurality of bits, with each bit denoting a clearing status of a corresponding block in the frame buffer. A background flag value of the bit may indicate the corresponding block has been cleared, and a non-background flag value of the bit may indicate the corresponding block has been modified. For example, the background flag value may be, but not limited to, one that may indicate the corresponding block has been cleared; while the non-background flag value is zero may indicate that the corresponding block has been modified. The clear tag table 610 may be small on-chip storage medium. The address mapping and clear (AMC) controller 620 is configured to translate the incoming memory address 514a into an index of the corresponding block in the frame buffer, and generate a result indicating a clearing status of the corresponding block. This AMC controller also sets up a plurality of entries of the clear tag table to the background flag value when a clear command is received. Since it may take some time to set up the clear tag table, there is a finish bit generated by the AMC controller to indicate the completion of the reset process. When a write command is received, this AMC controller generates a write enable signal and a write operation is performed to the clear tag table.

Figure 7A:
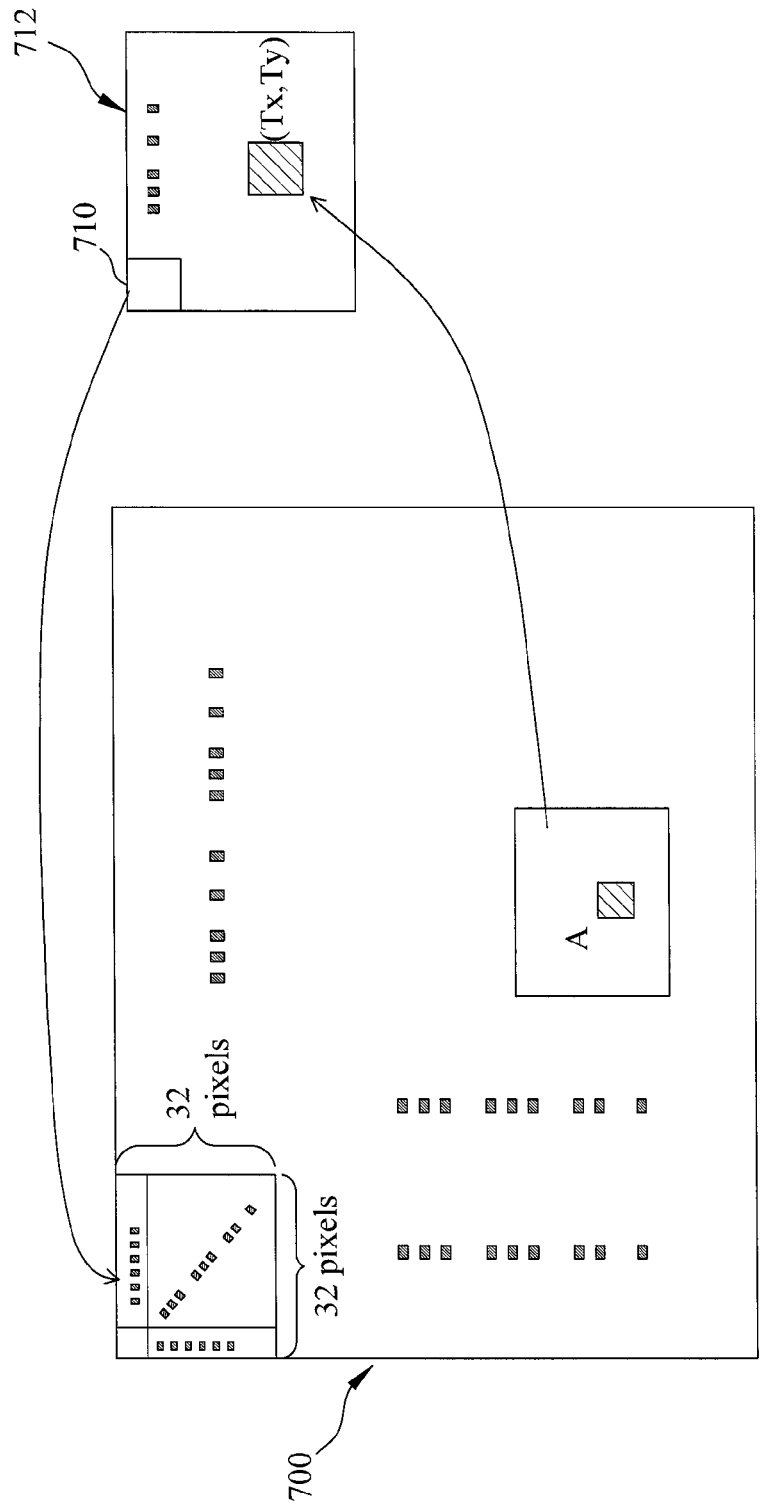
FIG. 7A shows an example of the mapping process, wherein a block is a 2-dimensional array, according to an exemplary embodiment.
Figure 7B:
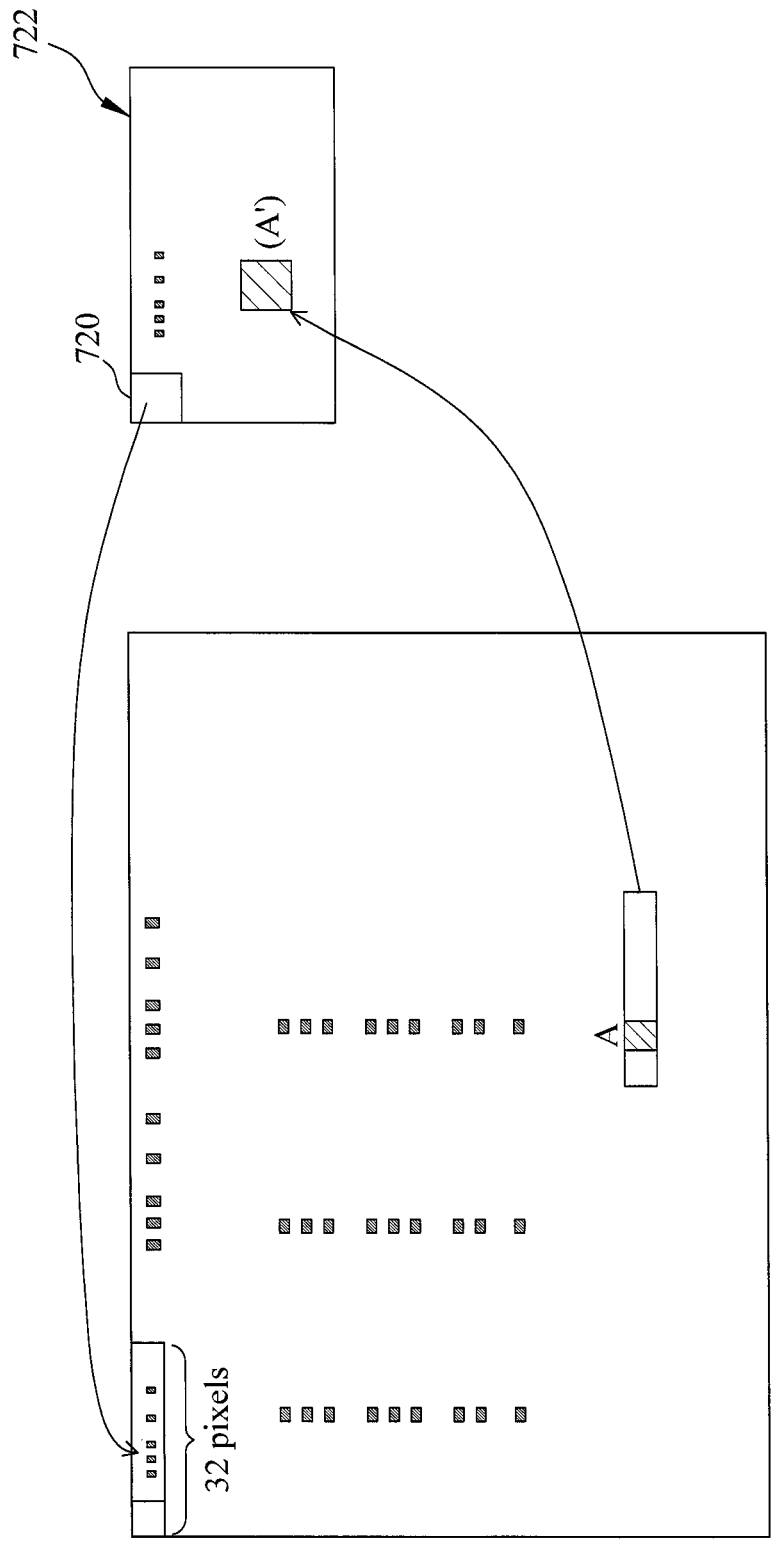
FIG. 7B shows an example of the mapping process, wherein a block is a 1-dimensional array, according to an exemplary embodiment.

The organization of the clear tag table may be determined by how a block is defined for the frame buffer and the cost and/or performance of the AMC controller. FIG. 7A shows an example of the mapping process, wherein a block is a 2-dimensional array, according to an exemplary embodiment. As shown in FIG. 7A, a frame buffer 700 is partitioned into blocks, wherein a block is a two-dimensional array such as a 32×32 block. Each block is mapped into one bit in an exemplary clear tag table 712. In other words, each tag location 710 of the clear tag table 712 represents a 32×32 block in this exemplar. The pixel A with location (x,y) in the frame buffer 700 has a linear address offset, i.e. x+width of the frame buffer×y, to the base of the frame buffer 700 in a memory. The AMC controller maps the address of pixel A into a bit (Tx, Ty) in the clear tag table 712. This address mapping may involve integer division and modulus operations. When both the block and the clear tag table are defined as one-dimensional arrays, it may avoid the cost of the divider. FIG. 7B shows an example of the mapping process, wherein a block is defined as a one-dimensional array, according to an exemplary embodiment.

As shown in FIG. 7B, a block is a one-dimensional array such as a 32×1 block. In other words, each tag location 720 of a clear tag table 722 represents a 32×1 block in this exemplar. The block's shape and size may impact the performance and cost of the BC hardware agent. For example, the mapping scheme in FIG. 7A requires a smaller clear tag table with a complex address mapping circuit which takes multiple cycles per mapping, while the mapping method in FIG. 7B requires a larger clear tag table with a much simpler address mapping circuit which takes only one cycle per mapping. The same size of the clear tag table may be fitted into a memory with different aspect ratios. For example, a 9600-bit table in the BC hardware agent may be fitted into a memory with either 1×9600, 32×300, 75×128, or 9600×1 aspect ratio. The choice is based on the number of cycles taken to fill the entire clear tag table with the initial value (when the frame buffer is cleared) and the feasibility of the hardware implementation. For example, a 1×9600 memory takes only one cycle to fill the entire memory, its memory word is too wide to be implemented efficiently and consumes too much power. On the other hand, a 9600×1 memory, although with efficient physical implementation and lower power, too many cycles (9600) is taken to fill the entire memory.

Figure 8:
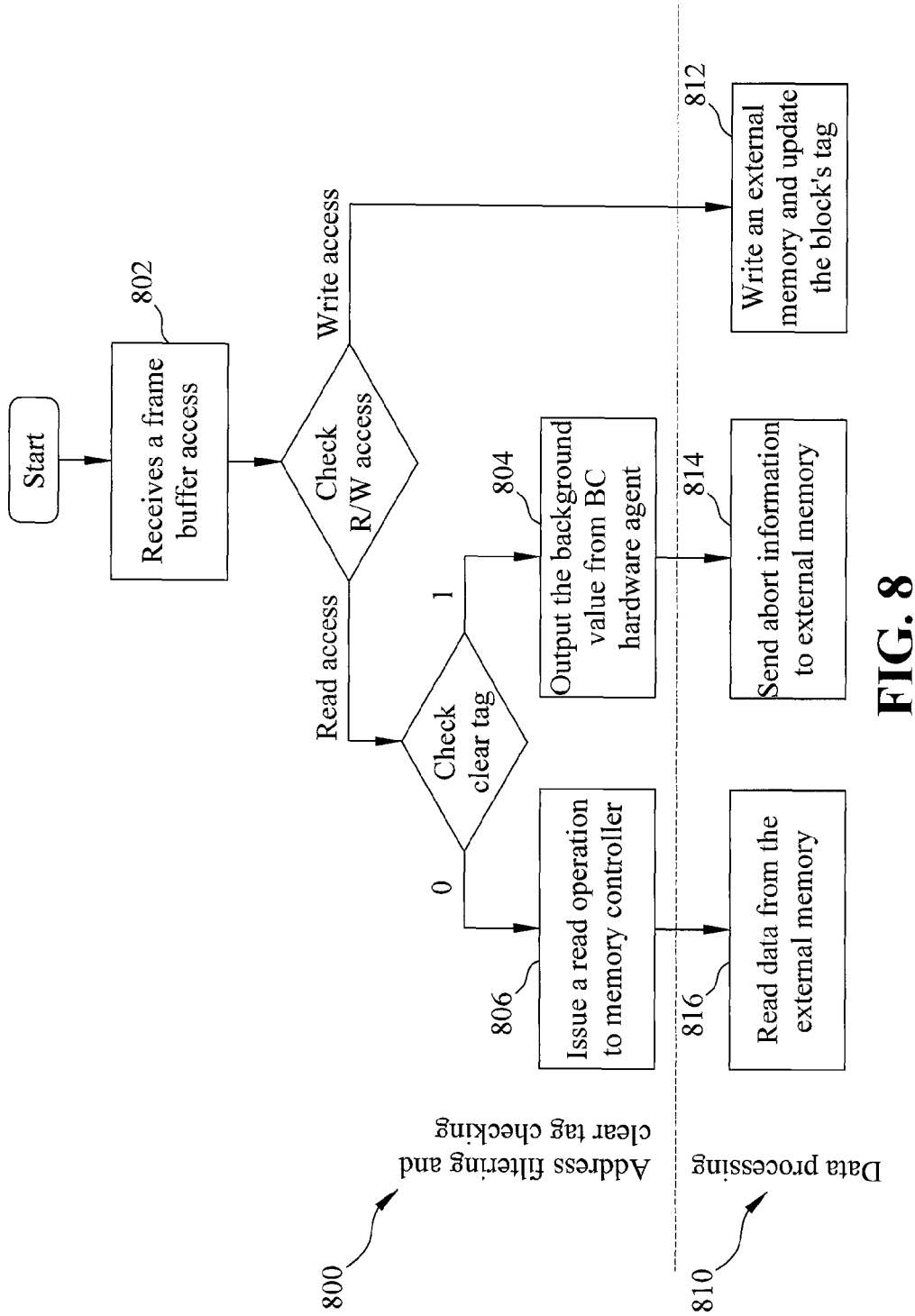
FIG. 8 shows an operation flow of the BC hardware agent, according to an exemplary embodiment.

Accordingly, FIG. 8 shows an operation flow of the BC hardware agent 410, according to an exemplary embodiment. Referring to FIG. 8, when the BC hardware agent 410 receives a frame buffer access (step 802), it checks that the frame buffer access is a read access or a write access. The frame buffer access may include an address that identifies a block, and the address may be from the system bus 420. For a write access, the access is directly passed to the memory controller 430 and a corresponding entry of the clear tag table is set to the non-background flag value. For a read access, the BC hardware agent checks a corresponding clear tag. If the value of the corresponding clear tag is the background flag value, the BC agent returns the data in its background register without initiating a memory read operation to the memory controller 430. If such a memory read operation has been issued, it is aborted.

In other words, when the BC hardware agent 410 receive a write access, the BC hardware agent 410 directly passes the access to the memory controller 430 for writing an external memory and updating the block's tag (step 812), thus a corresponding entry (called clear tag) of the clear tag table is set to the non-background flag value. When the BC hardware agent 410 receives a read access and a value of a corresponding clear tag is the background flag value, the BC hardware agent returns a background value stored in itself, i.e. outputting the background value from the BC hardware agent (step 804). When the BC hardware agent 410 receives a read access and a memory read operation has been issued, the BC hardware agent 410 sends abort information to an external memory (step 814). Thus both the access time and power of an external memory are saved. On the other hand, if the value of the clear tag is the non-background flag value, the BC hardware agent 410 issues a read operation to the memory controller 430 (step 806) for reading data from the external memory (step 816). The hardware implementation of the address filtering and clear tag checking operation (labeled as 800 in the FIG. 8) is very efficient and they can be completed in one clock cycle. The label 810 in the FIG. 8 is, but not limited to, an exemplary implementation for data processing of the external memory access and tag update. The produced data from step 812, or 814 or 816 will be sent to the system bus 420. The operation of step 812 or 814 can be completed in one clock cycle, while the operation of step 816 (i.e. reading data from the external memory) may take several cycles such as 8~20 cycles. As may be seen from FIG. 8, the BC hardware agent does not require any special signals besides the typical system bus and memory controller signals. The BC hardware agent may be, but not limited, directly integrated between the system bus 420 and the memory controller 430. This feature may make the BC hardware agent 410 suitable for platform-based SoCs.

Figure 9:
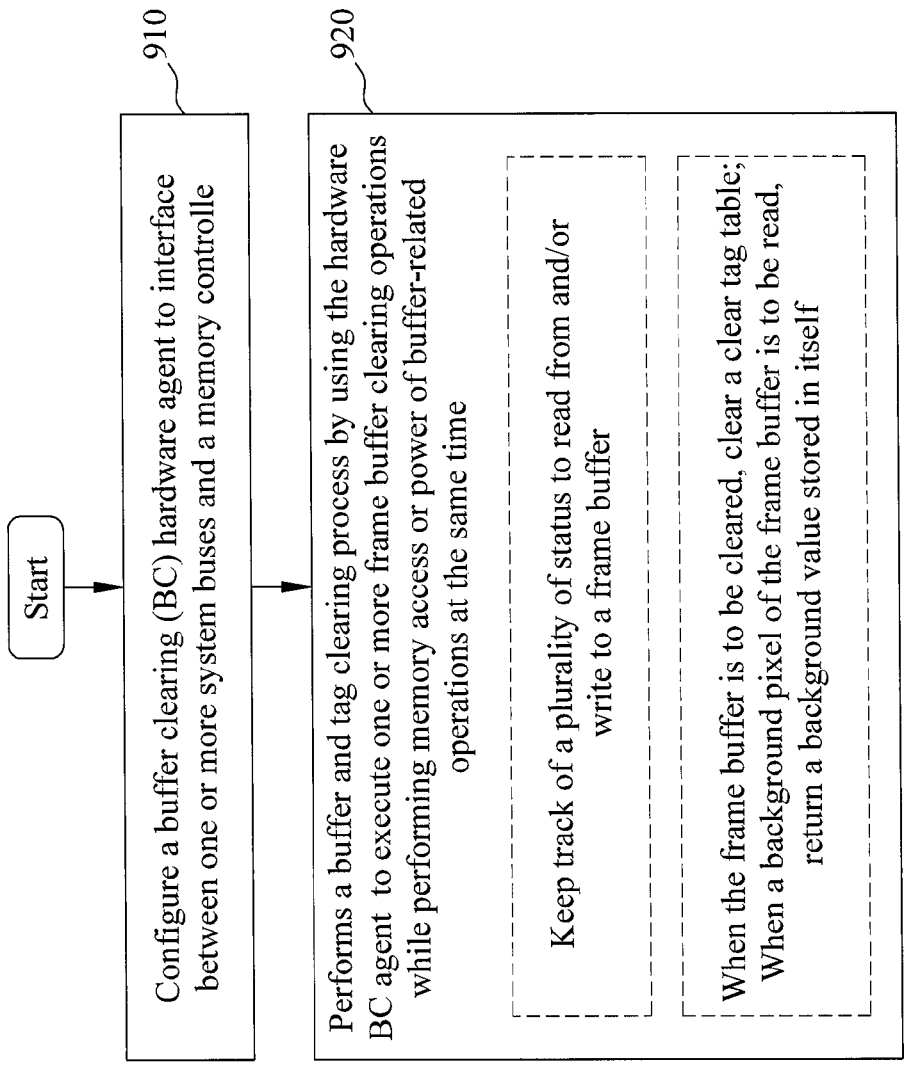
FIG. 9 shows a buffer clearing method for computer graphics, according to an exemplary embodiment, according to an exemplary embodiment

Therefore, as seen in FIG. 9, according to one exemplary embodiment, a buffer clearing method for computer graphics may configure a buffer clearing (BC) hardware agent to interface between one or more system buses and a memory controller (step 910), then performs a buffer and tag clearing process by using the hardware BC agent (step 920) to execute one or more frame buffer clearing operations while performing memory access and power of buffer-related operations at the same time, wherein during the buffer and tag clearing process, the BC hardware agent keeps track of a plurality of status such as a buffer clearing status, a drawing status, and a read status to read from and/or write to a frame buffer, and when the frame buffer is to be cleared, the BC hardware agent clears a clear tag table, when a background pixel of the frame buffer is to be read, the BC hardware agent returns a background value stored in itself.

The BC hardware agent may further perform an address filtering process by an address filter to determine if an incoming memory address relates to a frame buffer access. As mentioned earlier, the address filter 514 may determines if the incoming memory access is for the frame buffer by comparing the address with the content in the frame buffer register 512a. In the buffer and tag clearing process, the clear tag table may be configured into a plurality of bits, with each bit denoting a clearing status of a corresponding block in the frame buffer. And an address mapping and clear (AMC) controller may be used to translate an incoming memory address into an index of the corresponding block in the frame buffer, and set up the entries of the clear tag table to the background flag value when a clear command is received. The organization and operations of BC hardware agent 410 have been described in the disclosed exemplary embodiments.

According to the exemplary embodiments of the disclosure, the BC hardware agent 410 may be activated by 3DG applications running on the CPU. For example, during the initialization process, the device driver of the frame buffer may be responsible to configure the frame buffer register 512a to allocate the memory location for the frame buffer, and to set up the function control register 512c to disable the BC hardware agent 410 and reset the clear tag table 502. When a 3DG application decides to activate the BC hardware agent, it may set an enable bit in the function control register 512c. 3DG applications may work with the BC hardware agent when the BC hardware agent is activated. For example, a 3DG application library may be OpenGL ES. In OpenGL ES, there are two commands related to frame buffer clearing. The glClearColor command assigns the background color. The glClear command fills (clears) the frame buffer with the background information such as background color. To work with the BC hardware agent, the glClearColor command configures the background register 512b of the BC hardware agent and the glClear command configures the function control register 512c to initiate the operation to set the bits of the clear tag table 502 to the background flag value, instead of actually filling the frame buffer.

The BC hardware agent may be transparent to the CPU and the 3DG accelerator during the pixel rendering process. The BC hardware agent is also transparent to the display unit when it fetches the data from the frame buffer for display. For the CPU, the 3DG accelerator and the display unit, the BC hardware agent monitors the frame buffer access and supplies the background color from its register directly, instead of from the frame buffer. The BC hardware agent also improves the system performance and energy consumption. For example, when the frame buffer is to be cleared, the BC hardware agent only clears a clear tag table. Compared with clearing a much larger external memory, the clear tag table is a much smaller memory. And, clearing the clear tag table is faster and consumes less energy. In addition, when clearing the frame buffer, the BC hardware agent writes one bit to the clear tag table for each block of pixels, instead of writing a whole 32-bit color per pixel to the external memory. Also, a block of pixels with the background information may be read directly from the BC hardware agent instead of from the frame buffer, thereby saving the memory access time and energy. Since the clearing operation occurs within the clear tag table which is an internal memory of the BC hardware agent and is not connected to the system bus, the buffer clearing operation is not required to use the system bus and thus available bus bandwidth may be utilized by other SoC components.

Figure 10:
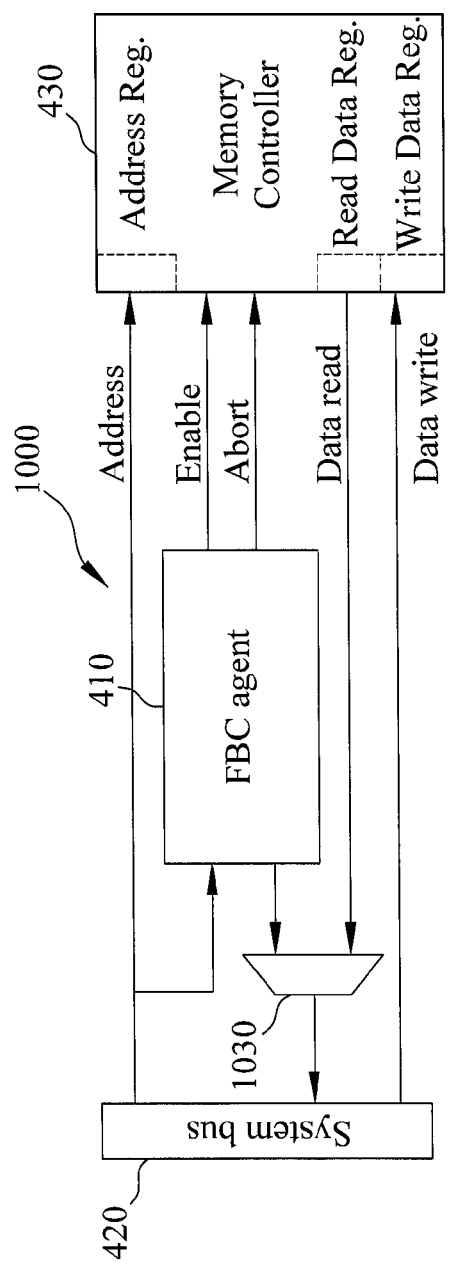
FIG. 10 shows a schematic view of a performance-oriented style to connect the BC hardware agent to a SoC, according to another exemplary embodiment.
Figure 11:
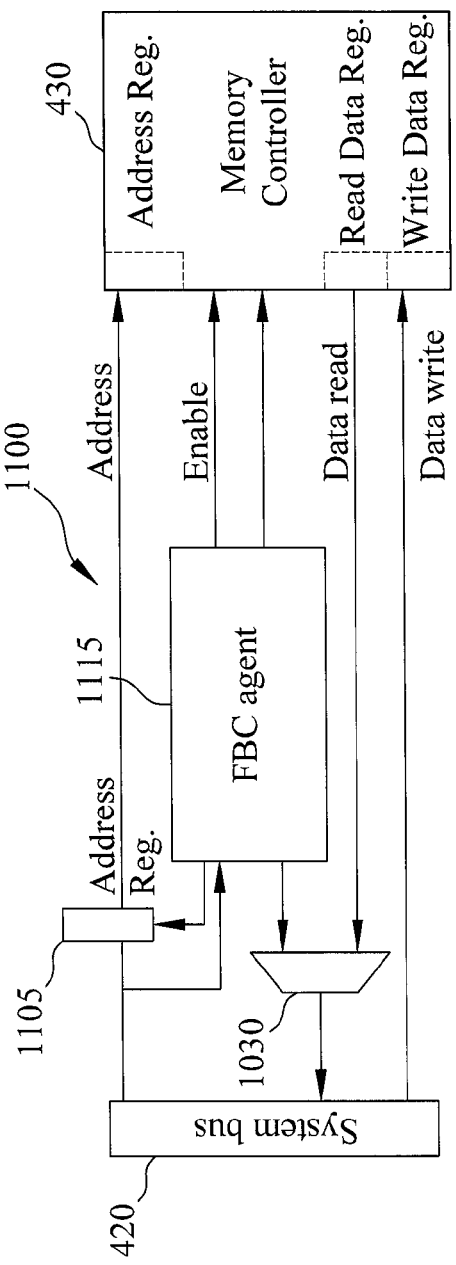
FIG. 11 a schematic view of an energy-oriented style to connect the BC hardware agent to a SoC, according to another exemplary embodiment.

As mentioned earlier, the BC hardware agent may be directly integrated into platform-based 3DG SoCs. FIG. 10 and FIG. 11 are styles to connect the BC hardware agent to a SoC, respectively, according to exemplary embodiments. According to the SoC 1000 with a performance-oriented style shown in FIG. 10, system bus 420 is directly connect to the memory controller 430 while the BC hardware agent 410 snoops on the memory request between the system bus 420 and the memory controller 430. The BC hardware agent 410 operates simultaneously while the memory controller processes the memory request. When the BC hardware agent 410 finds that the memory request is a read to a cleared block, the BC hardware agent 410 returns the background information directly to the system bus 420 and sends an abort signal to cancel the operation of the memory controller 430. If such cancellation is too late or is not supported by the memory controller 430, the value returned from the memory controller 430, which might be a few cycles later, is simply dropped by the multiplexor 1030 along the data read path in the figure. This integration style maintains high performance, but might waste energy (such as memory read operation) when the memory request cannot be cancelled.

The above issue of unnecessary memory operation of the memory controller may be avoided. According to one exemplary embodiment, the BC hardware agent may be integrated into a SoC 1100 with an energy-oriented style, as shown in FIG. 11. There is an address register 1105 which blocks between the system bus 420 and the memory controller 430. When the system bus 420 issues a memory request, the request is stored in the address register 1105 while the BC hardware agent 1115 spends one clock cycle to determine if the request has to be passed to the memory controller 430. If yes, the memory controller 430 is enabled in the next cycle; if not, the memory controller 430 is kept idle. Such scheme saves the energy for the unnecessary memory request but pays the cost of an extra cycle before the memory controller 430.

Another concern in SoC integration is that the multiplexer 1030 on the data read path. This multiplexer 1030 may add extra time to the path. Such path is usually not on the critical path of the SoC. This path starts from the read data register of the memory controller 430, travels along the multiplexer and the system bus 420, and ends at a register in the bus interface of a bus master (such as the cache or the 3DG accelerator). It is a relatively simple path in a SoC since there is no complicated module along the path. When such path is indeed the critical path of the SoC, pipelining the system bus 420 or adding a register at the output of the multiplexer 1030 may break the critical path.

In summary of the disclosure, the above exemplary embodiments of the buffer clearing apparatus and method for computer graphics provide an efficient buffer clearing (BC) hardware agent which interfaces between the system bus and the memory controller to execute the frame buffer clearing and displaying. When the frame buffer is to be cleared, the BC hardware agent clears the clear tag table, a small internal storage medium, instead of the actual frame buffer in the external memory. When a background pixel of the frame buffer is to be read, the BC hardware agent returns the background value stored in the BC hardware agent instead of reading the data from the external memory. Thus performance and energy are improved for both the buffer clearing operation and the buffer display operation. The BC hardware agent may be configured in different ways that may satisfy, but not limit to, performance-oriented or energy-oriented needs. Unlike related works that rely on expensive special architecture or memory organization, the BC hardware agent of the disclosed exemplary embodiments is a very low cost solution that is retargetable to many 3D graphics applications such as typical SoC platforms in consumer electronics devices.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A buffer clearing apparatus for computer graphics, comprising:
    a buffer clearing (BC) hardware agent configured to interface between one or more system buses and a memory controller, to execute one or more frame buffer clearing operations while performing memory access or power of buffer-related operations at the same time;
    wherein said BC hardware agent keeps track of a plurality of status statuses to perform read and/or write to a frame buffer, and when said frame buffer is to be cleared, the BC hardware agent clears a clear tag table, when a background pixel of said frame buffer is to be read, the BC hardware agent returns a background value stored in itself.

2. The apparatus as claimed in claim 1, wherein said frame buffer is contained in an external memory connected to the memory controller.

3. The apparatus as claimed in claim 1, wherein said BC hardware agent configures a BC controller to allocate a memory location for said frame buffer, and disable the BC hardware agent and reset the clear tag table.

4. The apparatus as claimed in claim 3, wherein said BC controller has a first register storing base address information and size information of the frame buffer and providing a flexibility to allow remapping the frame buffer, a second register storing a background information for the frame buffer, and a third register with a plurality of fields for the control of enable, reset, block size, clear and completion operations.

5. The apparatus as claimed in claim 4, wherein said background information is one of background color information or background depth information, or both the background color information and the background depth information.

6. The apparatus as claimed in claim 1, wherein said BC hardware agent configures an address filter to determine if an incoming memory address relates to a frame buffer access.

7. The apparatus as claimed in claim 1, wherein said BC hardware agent configures a frame buffer clear check module to check if a block of pixels in the frame buffer have been cleared with a background information, and said block of pixels is pointed by an incoming address.

8. The apparatus as claimed in claim 7, wherein said frame buffer clear check module further includes:
    the clear tag table having a plurality of bits, with each bit denoting a clearing status of a corresponding block in the frame buffer; and
    an address mapping and clear (AMC) controller configured to translate an incoming memory address into an index of the corresponding block in the frame buffer, and to set up a plurality of entries of the clear tag table to a background flag value when a clear command is received.

9. The apparatus as claimed in claim 8, wherein said AMC controller generates a finish bit to indicate a completion of a reset process to set up the clear tag table.

10. The apparatus as claimed in claim 1, wherein said BC hardware agent is integrated into a system on chip.

11. The apparatus as claimed in claim 1, wherein said BC hardware agent is transparent to a central processing unit and a 3-dimensional graphics accelerator during a pixel rendering process.

12. The apparatus as claimed in claim 1, wherein said BC hardware agent is transparent to a display unit when it fetches data from the frame buffer for display.

13. A buffer clearing method for computer graphics, comprising:
    configuring a buffer clearing (BC) hardware agent to interface between one or more system buses and a memory controller; and
    performing a buffer and tag checking process by using said BC hardware agent to execute one or more frame buffer clearing operations while performing a plurality of memory access or power of buffer-related operations at the same time;
    wherein during said buffer and tag clearing process, the BC hardware agent keeps track of a plurality of statuses to read from and/or write to a frame buffer, and when said frame buffer is to be cleared, the BC hardware agent clears a clear tag table, when a background pixel of said frame buffer is to be read, the BC hardware agent returns a background value stored in itself.

14. The method as claimed in claim 13, wherein when said BC hardware agent receives a write access, said BC hardware agent passes said write access to said memory controller and setting a corresponding entry of the clear tag table to a non-background flag value.

15. The method as claimed in claim 13, wherein when said BC hardware agent receives a read access and a value of a corresponding clear tag is a background flag value, said BC hardware agent returns said background value stored in itself.

16. The method as claimed in claim 13, wherein when said BC hardware agent receives a read access and a memory read operation has been issued, the BC hardware agent sends abort information to an external memory.

17. The method as claimed in claim 13, wherein said BC hardware agent is integrated into a system on chip.

18. The method as claimed in claim 13, wherein said plurality of statuses include a buffer clearing status, a drawing status, and a read status to read from and/or write to said frame buffer.

19. The method as claimed in claim 13, wherein said buffer and tag clearing process further includes:
    configuring said clear tag table into a plurality of bits, with each bit denoting a clearing status of a corresponding block in the frame buffer.

20. The method as claimed in claim 19, wherein said buffer and tag clearing process further includes:
    using an address mapping and clear controller to translate an incoming memory address into an index of the corresponding block in the frame buffer, and to set up a plurality of entries of the clear tag table to a background flag value when a clear command is received.

21. The method as claimed in claim 13, wherein said BC hardware agent further performs an address filtering process to determine if an incoming memory address relates to a frame buffer access, by comparing the incoming memory address with a content in a frame buffer register.

* * * * *